Jan. 8, 1929.
L. T. RASMUSSEN
1,698,451
PACKING AND MULCHING IMPLEMENT
Filed Feb. 6, 1928
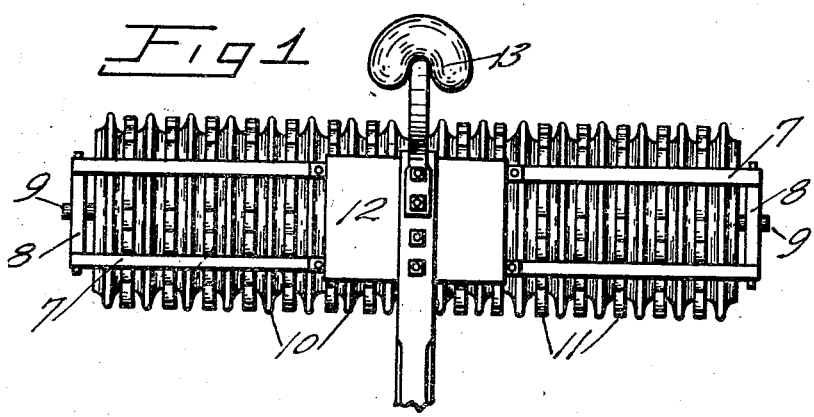
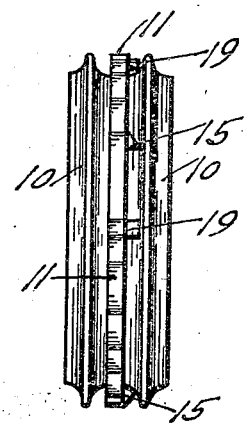
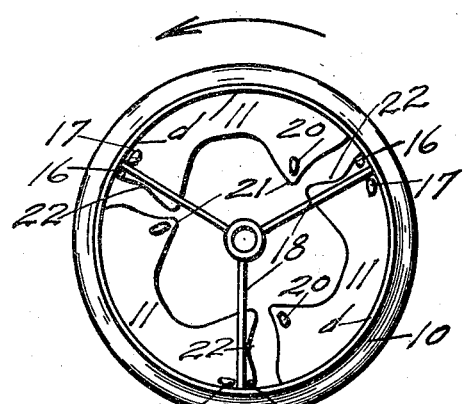
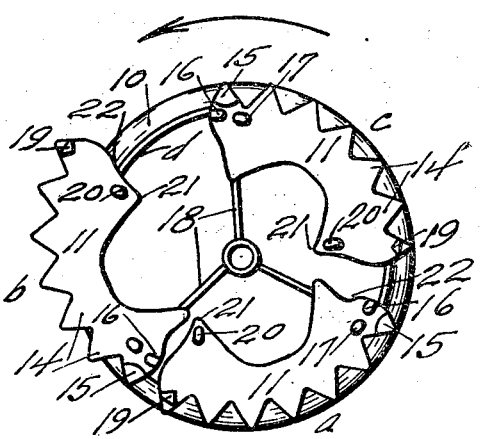
Inventor
L. T. RASMUSSEN
By Herram H. Sturges
Attorney Patented Jan. 8, 1929.

1,698,451

UNITED STATES PATENT OFFICE.

LAURITS T. RASMUSSEN, OF COUNCIL BLUFFS, IOWA, ASSIGNOR TO L. H. KATELMAN, OF COUNCIL BLUFFS, IOWA.

PACKING AND MULCHING IMPLEMENT.

Application filed February 6, 1928. Serial No. 252,155.

This invention relates to a packing and mulching implement. Agricultural implements similar to the present invention are extensively used, and generally consist of disc-wheels and mulching-wheels mounted to freely rotate on a shaft, the mulching-wheels being disposed between the packing-wheels. The shaft is generally mounted in a frame of suitable length, and when drawn across a field the discs operate to pack the ground, and the surface of the ground between the discs or packing-wheels will be disturbed, indented or mulched, the advantages in use of these implements being in part, that air-pockets will be filled and moisture from rain will be conserved.

The disadvantage in the use of these implements or some of them, heretofore, has been that the mulching-wheels become clogged with clay, gumbo or other adhesive material, the operation being that, when thus clogged the mulching-wheels will not function since the spaces between the discs or packing-wheels will become filled with the adhesive material.

The principal object of the present invention is to provide such a construction that during operation adhesive earth, such as mud, muck, clay, gumbo or foreign substances, will not obstruct, hinder or interfere with mulching.

The invention includes a plurality of mulching-bars used as a substitute for a mulching-wheel, each mulching-bar being formed as a toothed segment and adapted to be moved or swung outwardly for dislodging and removing adhesions from the space between the packing-wheels to prevent clogging, the operation of said mulching-bars being automatic and caused by the weight of the implement while it is moving across a field.

The invention discloses a new and useful construction, combination, and arrangement of parts as described herein and claimed, and as illustrated in the accompanying drawings, it being understood that changes may be made in form, size, proportion of parts and minor details without departing from the spirit of the invention, said changes being determined by the scope of the invention as claimed.

In the drawing, Fig. 1 is a plan view of the implement. Fig. 2 is an enlarged detail relating to Fig. 1 showing a set of muching-bars being two packing-discs. Fig. 3 is a side view to illustrate the mounting of the mulching-bars. Fig. 4 is a view similar to the view shown in Fig. 3, one of the packing-discs being removed to clearly show the mulching-bars. Fig. 5 is a plan view of one of the mulching-bars.

Referring now to the drawing for a more particular description, numeral 7 indicates a frame including end-blocks 8 in which is journalled a shaft 9 and on said shaft are journalled a plurality of discs or packing-wheels 10, and between the discs 10 are disposed certain mulching-members of bars 11.

The shaft 9 and frame 7 may have any suitable length, and the packing-discs may have any required diameter. Numeral 12 indicates a platform which is provided for the frame and a driver's seat is included at 13.

The segments are used in series, the segments of each series being carried by a single packing-disc and disposed between a pair of packing-discs. In Figs. 3 and 4 of the drawings I have shown one of said series of segments, these being indicated specifically at $a$, $b$ and $c$. While I have three segments for a series, the exact number is not important since operation would be the same.

The segments are of uniform proportions and they have a thickness adapted to permit them to swing and to slide outwardly beyond the plane of the packing-discs and to slide inwardly thereof to a normal position without undue friction, and it will be understood that the mulching-bars are automatically swung outwardly in succession for the purpose of removing adhesions from the space between the tires of the adjacently disposed packing-discs.

Each segment is provided with a row of teeth 14 at its outer curved convex edge and is provided with a pair of lugs 15 and 16 at one of its ends, the lug 15 being disposed at the outer side of the tire or rim $d$ of a packing-disc to prevent an inward movement of one end of the segment during the swinging movement of said segment. The lug 16 is disposed at the inner side of the tire or rim $d$ to co-operate with the lug 15 in providing such a mounting for the segment that it may have swinging movements. The lugs 15 and 16 co-operate to provide a loose mounting equivalent to the use of a pivot, but superior to a pivot, since the latter might become injured or broken. In the present instance all principal stresses will be supported by the lug 15, and this lug therefore, has an adequate width and is of such proportion that it will adequately support all stresses directed thereto incident to its use.

Numeral 17 indicates a projection which is disposed adjacent to the lug 15 and which is provided for the segment. This projection co-operates with the lug 16 for preventing any undue longitudinal movement of the segment relative to the packing-disc. As best shown in Fig. 3 of the drawing these members 16 and 17 are disposed at the respective sides of a spoke 18 of a packing-disc and any undue longitudinal movement of a segment relative to a packing-disc will be prevented. As thus described the segments may have swinging movements in a circle's arc, the center of said arc being located between the lugs 15 and 16.

Numerals 19 and 20 indicate a pair of detent-members which are provided for each segment, these detent-members being disposed at the ends of the segments opposite to the lugs above described. The detent 19 limits the degree of movement of the segment when it swings outwardly of a packing-disc and the detent 20 limits the swinging movement of the segment inwardly of a packing-disc.

As thus described the segments of each series are disposed approximately end to end between two adjacent packing-discs. While they are mounted upon and move with the rotatable movements of a single packing-disc they each have swinging movements in succession and automatically as mentioned. The means for their last named movements will now be described.

It will be seen that each segment at one of its ends near its detents 19 and 20 is provided with a head-member 21, its opposite end being provided with a contact-face 22, and in operation when the segment $a$ engages the ground it will be pressed upon the ground and will move inwardly between a pair of packing-discs, its head-member moving into engagement with the contact-face 22 of an adjacent segment $b$, said engagement causing the segment $b$ to have a swinging movement outwardly for removing any adhesive material from the space between the two adjacent packing-discs.

In operation the teeth of each segment will enter the ground when the rotatable movement of the packing-disc carries the segment to its lowermost position, and since the packing-discs rotate in the direction of the arrow shown in the drawing the inward swinging movement of the segment will not be attended by undue vibration or shocks, and the teeth of the segment will cause the ground between the adjacent discs to be indented or mulched.

The inward swinging movement of the segment $a$ will cause the segment $b$ to be swung outwardly of the plane of the discs, and thereafter when the segment $b$ engages the ground it will be swung inwardly for causing an outward swinging movement of the segment $c$, and this will be continued while the frame is drawn forwardly across the field, the segments operating in succession for mulching and for dislodging clay, mud, gumbo or other substances from the space between two adjacent packing-discs.

While I have stated that the shaft 8 is journalled in the frame and that the packing-discs are journalled on the shaft this is not important, the important feature being that the packing-discs may freely rotate, and any suitable mounting for these parts may be employed for this purpose.

I claim as my invention:—

1. In a packing and mulching implement, a supported shaft, a plurality of rotatable packing-discs mounted adjacent to each other on the shaft, a plurality of toothed mulching-segments arranged in series, the segments of each series being mounted on one of the packing-discs between a pair of discs, the mounting of the segments being of such arrangement that the segments of each series will be swung outwardly of the plane of the packing-discs in succession during the rotatable movements of said discs.

2. In a packing and mulching implement, a supported shaft, a plurality of rotatable packing-discs on the shaft, a plurality of mulching-segments arranged in series between the rotatable packing-discs, the segments of each series being mounted on a single disc to permit swinging movements thereon in succession for causing a swinging movement of an adjacent segment outwardly of the plane of said packing-discs by the rotatable movement of said discs.

3. In a packing and mulching implement, a plurality of packing-discs disposed adjacent to each other and rotatable on a shaft, toothed mulching segments arranged in series end to end between the packing-discs, the segments of each series being mounted on a single disc and movable therewith, the operation being that the segments of a series will engage the ground in succession to cause an adjacent segment to swing outwardly of the plane of said discs.

4. In a packing and mulching implement, a shaft, a pair of rotatable packing-discs disposed adjacent to each other on the shaft and adapted to engage the ground, a plurality of toothed mulching-segments interposed between the packing-discs and movable with one of said discs, and adapted to have swinging movements thereon, the mounting of said segments being such that they will have swinging movements in succession toward the shaft while engaging the ground for causing an adjacent segment to swing outwardly of the plane of said packing-discs.

5. In a packing and mulching implement, the combination with a forwardly movable frame, a shaft movable with the frame, and a plurality of ground-engaging packing-discs disposed adjacent to each other on the shaft and adapted to rotate by movements of the frame, a plurality of toothed segmental mulching-bars arranged in series, the bars of each series being disposed end to end outwardly of the shaft between two packing-discs and movable with one of said discs for engaging the ground in succession, each mulching-bar being movable toward the shaft while engaging the ground to cause a movement of an adjacent mulching-bar outwardly of the shaft and outwardly of the plane of said packing-discs.

6. In a packing and mulching implement, the combination with a forwardly movable frame, a shaft movable with the frame, a plurality of ground-engaging packing-discs disposed adjacent to each other upon the shaft and rotatable by the movements of the frame, a plurality of toothed segmental mulching-bars arranged in series, the bars of each series being disposed between a pair of packing-discs and movable with one of the discs of said pair for engaging the ground in succession, each bar of a series being movable toward the shaft by its engagement with the ground to cause it to engage an adjacent bar for moving the last named bar outwardly of the plane of said packing-discs.

7. In a packing and mulching implement, a plurality of rotatable packing-discs mounted on a shaft and disposed adjacent to each other, a plurality of toothed segmental mulching-bars arranged in series, the bars of each series being disposed end to end between a single pair of packing-discs, the segments of each series being movable inwardly of a packing-disc for moving an adjacent segment outwardly of the plane of the disc-wheels, each segment being provided with detent-members for engaging a packing-disc to control its movements.

In testimony whereof, I have affixed my signature.

LAURITS T. RASMUSSEN.